Figure 3:
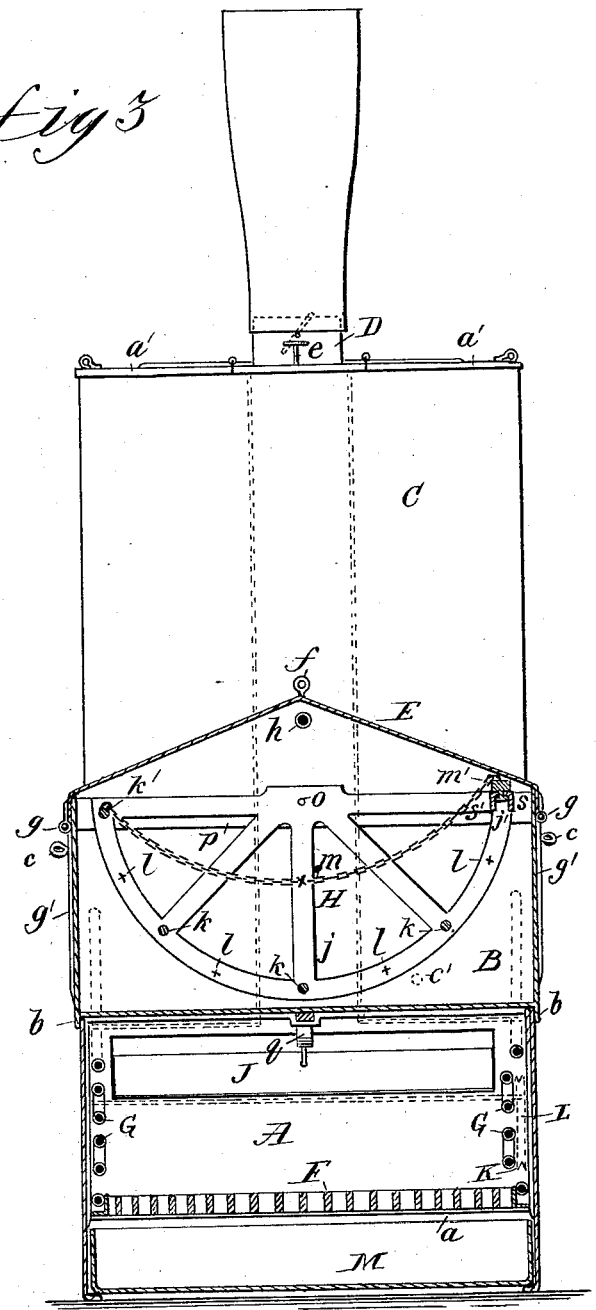

(Model.)
S. N. ALFORD.
AGRICULTURAL BOILER.
No. 285,541. Patented Sept. 25, 1883.
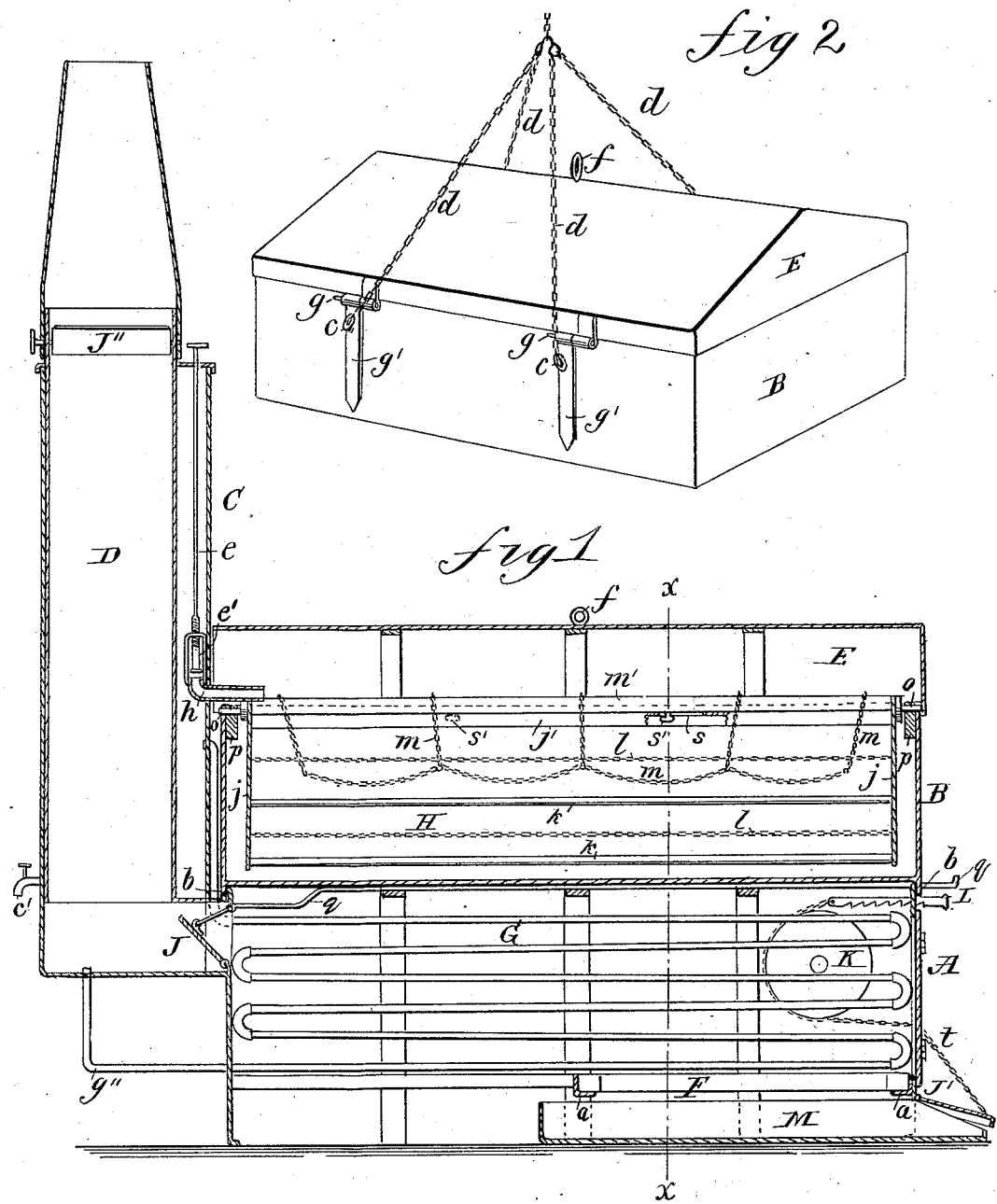
WITNESSES:
INVENTOR:
S. N. Alford
BY Munn & Co
ATTORNEYS.

(Model.)  2 Sheets—Sheet 2.

S. N. ALFORD.
AGRICULTURAL BOILER.

No. 285,541. Patented Sept. 25, 1883.

WITNESSES:

INVENTOR:
S. N. Alford
BY
ATTORNEYS.

UNITED STATES PATENT OFFICE.

SAMUEL N. ALFORD, OF PORTLAND, OREGON.

AGRICULTURAL BOILER.

SPECIFICATION forming part of Letters Patent No. 285,541, dated September 25, 1883.

Application filed March 6, 1883. (M del.)

*To all whom it may concern:*

Be it known that I, SAMUEL N. ALFORD, of Portland, in the county of Multnomah and State of Oregon, have invented a new and Improved Cooking, Water-Heating, and Scalding Apparatus for Farmers' Use, of which the following is a full, clear, and exact description.

Reference is to be had to the accompanying drawings, forming part of this specification, in which similar letters of reference indicate corresponding parts in all the figures.

Figure 1 is a longitudinal sectional elevation of my invention. Fig. 2 is a perspective view of the removable pan and cover removed from the heating apparatus, and Fig. 3 is a transverse sectional elevation taken on the line $x\,x$ of Fig. 1.

The object of this invention is to provide an apparatus for cooking vegetables and grain for stock, and for heating water for general farm purposes, which apparatus shall be cheap, simple, and not liable to get out of order, and which will be economical in the consumption of fuel, and which may also be used to great advantage in scalding hogs; and to these ends my invention consists of the construction, arrangement, and combination of parts, all as hereinafter described and claimed.

The fire-box A, pan B, water-tank C, smoke-stack D, and cover E may be of any suitable size, and are by preference made of sheet-iron. The grate-bars F are made of cast-iron, and are held in the fire-box upon the ribs or ledges $a\,a$, as shown in Fig. 2. The bottom of the pan B is flanged at its lower edges, as shown at $b\,b$, so that it is adapted to fit upon the fire-box A, as shown in the drawings, and so that it may be placed with either end forward upon the fire-box.

G G are water-pipes placed inside the fire-box, at the sides thereof, as shown, through which pipes water from the water-tank C circulates for rapidly heating the water and for keeping the outer side walls of the fire-box cool. Instead of these pipes, fire-brick or other refractory material may be used for protecting and keeping cool the walls of the fire-box.

The pan B is provided on both sides with the rings $c\,c$, into which the chains $d\,d$ may be attached, by which the pan may be elevated by a suitable tackle above and swung off from and replaced upon the fire-box, and the cover E is provided with the eye $f$, by which it may be conveniently lifted off from the pan, and the cover is provided also with the hinge-pins $g\,g$, which are adapted to be shoved into the eyes of the hinge-straps $g'\,g'$, secured to the pan, so that the cover may be operated on hinges, if desired; and to facilitate the entire removal of the cover from the pan its rear end is left open, so that it may be drawn back for withdrawing the hinge-pins from the eyes of the hinge-straps, as will be understood from Fig. 2; and when the cover E is in place on the pan B its open end abuts against the tank C to tightly close or cover the pan at that point, and also inclose the pipe or spout $h$ of the tank, which spout $h$ is controlled by a valve and rod, $e'\,e$, for discharging water from tank C into pan B whether the cover E is on or off the pan, as will be readily understood. The water-tank C surrounds the smoke-stack D, as shown in Figs. 1 and 3, so that the fire-box serves not only to heat whatever may be placed in the pan B, but also at the same time to heat the water in the said water-box, so that the heat is utilized to the best advantage. Besides, by this arrangement, in case a considerable amount of grain or vegetables is to be cooked, a constant supply of hot water will always be at hand after cooking the first panful, so that the second supply of material placed in the pan may be supplied with hot water from the tank C, instead of cold water, as is the usual practice.

H is a scalding-cradle, into which a hog may be placed, and then, together with the cradle, immersed in hot water in the pan B for scalding. This cradle is composed of the semicircular heads $j\,j$, rods $k\,k'$, chains $l\,l$, channel-bar $j'$, interlaced covering-chains $m$, and detachable bar $m'$, to which the covering-chains are attached at one end, the other end thereof being attached to the upper rod, $k'$, of the cradle proper. The heads $j$ are formed with the central gudgeons, $o\,o$, that are adapted to rest upon the bars $p\,p$ of the pan B, for journaling the cradle in the pan, so that the cradle and hog may be easily turned over and over in the pan for effecting a thorough scald.

For conveniently locking the interlaced covering-chains $m$ across the cradle for holding the hog in the cradle when it is revolved, I form the lock-slots $s$ $s$ through the upper side of the channel-bar $j'$, and form or provide the bar $m'$ with the headed studs $s'$ $s'$, that are adapted to be caught in these slots, as shown in Figs. 1 and 3; but other means might be devised for this purpose and not depart from the spirit of my invention.

At the back of the fire-box A, I hinge the damper J, which may be opened or closed or set at any desired position from the front of the apparatus by the rod $q$; and I also provide the fire-box at the front with the damper J' and the smoke-stack with the damper J'', so that the draft of the apparatus may be regulated as required, to gain the best results from the fuel consumed; and for the sake of convenience in manipulating the damper J', I provide it with the chain $t$, which passes back into the fire-box and up over the grooved pulley K, where it is attached to the inner end of the notched bar L, which protrudes at the front of the fire-box, as shown in Fig. 1, so that by moving this bar outward or inward the damper will be raised and lowered accordingly, and by means of the notches the damper may be held at any desired elevation.

M is an ash-pan placed under the grate-bars F, for catching the ashes, and for convenience in removing them from the apparatus.

The pipes G G will be provided with suitable cocks, as at $g''$, by means of which they may be emptied of water during cold weather, and the water-tank C will be provided with the cock $c'$ at the back, for drawing hot water from the tank for general use, and this tank will be filled from the top through the hinged doors $a'$ $a'$, as shown in Fig. 3.

The pan B is intended only to be removed from the fire-box when the material in it is cooked ready to be taken out, and then it will be raised from the fire-box and let down upon a wagon or sled, so that it can be hauled away and emptied. When the pan is to be used for scalding hogs, the water is let into it until it is full as needed, and then, when ready, the cradle is lifted up with the hog in it by a tackle, and let down into the pan and revolved, and when sufficiently scalded the cradle and hog are raised by the tackle and let down upon a platform and the hog removed from the cradle for cleaning. By leaving the pan upon the fire-box while scalding, the fire can be regulated by the dampers for keeping the water at the right temperature.

Constructed in the manner described, it will be seen that the apparatus is very complete, handy, durable, comparatively inexpensive, and is arranged to utilize the heat from the fuel in the most effective and economical manner.

Having thus described my invention, I claim as new and desire to secure by Letters Patent—

1. The combination, with the pan and cover—the latter left open at the rear—of the pins $g$ on the cover and the eye-straps $g'$ on the pan, whereby the cover may be hinged or detachable, as described.

2. The cradle H, formed of the heads $j$, rods $k$ $k'$, channel-bar $j'$, covering-chains $m$, and bar $m'$, adapted to be made fast to the bar $j'$, as and for the purposes set forth.

3. The combination, with the pan B and tank C, provided with the spout $h$, of the open-ended cover E, substantially as and for the purposes set forth.

4. The apparatus herein shown and described, consisting of the fire-box A, removable pan B, removable cover E, water-tank C, pipes G G, and stack D, placed in the water-tank and provided with the damper J'', the fire-box being provided with the dampers J and J', substantially as and for the purposes set forth.

SAMUEL N. ALFORD.

Witnesses:
EUGENE D. WHITE,
R. R. GILTNER.